US012289586B2

(12) United States Patent
Kemper et al.

(10) Patent No.: US 12,289,586 B2
(45) Date of Patent: Apr. 29, 2025

(54) DIFFERENTIAL MODELING OF ANALOG EFFECTS DEVICES AND GUITAR AMPLIFIERS

(71) Applicant: Christoph Kemper, Recklinghausen (DE)

(72) Inventors: Christoph Kemper, Recklinghausen (DE); Michael Eßer, Bochum (DE)

( * ) Notice: Subject to any disclaimer, the term of this patent is extended or adjusted under 35 U.S.C. 154(b) by 248 days.

(21) Appl. No.: 18/186,861

(22) Filed: Mar. 20, 2023

(65) Prior Publication Data

US 2023/0300530 A1 Sep. 21, 2023

(30) Foreign Application Priority Data

Mar. 21, 2022 (DE) ...................... 10 2022 106 576.6

(51) Int. Cl.
*H04R 3/04* (2006.01)
*G06F 3/16* (2006.01)
(52) U.S. Cl.
CPC .............. *H04R 3/04* (2013.01); *G06F 3/165* (2013.01); *H04R 2430/01* (2013.01)
(58) Field of Classification Search
CPC ....... H04R 3/04; H04R 2430/01; G06F 3/165; G10H 1/125
USPC .......................................................... 381/98
See application file for complete search history.

(56) References Cited

U.S. PATENT DOCUMENTS 11,164,551 B2 11/2021 Chase
2020/0279546 A1* 9/2020 Chase .................... G10H 1/125

OTHER PUBLICATIONS

Fracl Audio Systems: Multipoint Iterative Matching & Impendance Correction Technology (MIMIC TM). Plaistow, New Hampshire US, 2013. pp. 1-10.; https://www.fractalaudio.com/downloads/manuals/axe-fx-2/Fractal-Audio-systems-MIMIC-(tm)-Technology.pdf.

* cited by examiner

*Primary Examiner* — Paul Kim
(74) *Attorney, Agent, or Firm* — Craft Chu PLLC; Andrew W. Chu

(57) ABSTRACT

A method is proposed for adapting a sound converter to a reference sound converter at a target setting of an analog circuit of the reference sound converter. The sound converter has a sound transfer function. The analog circuit is digitally modeled by an analog function. At a default setting of the analog circuit, parameters of the sound transfer function of the sound converter are adapted to the reference sound converter. An analog function inverse to the analog function with default analog parameters corresponding to the default setting and the analog function with target analog parameters corresponding to the target setting are applied before or after the sound transfer function. Furthermore, a sound converter adapted for carrying out the method is proposed.

7 Claims, 3 Drawing Sheets

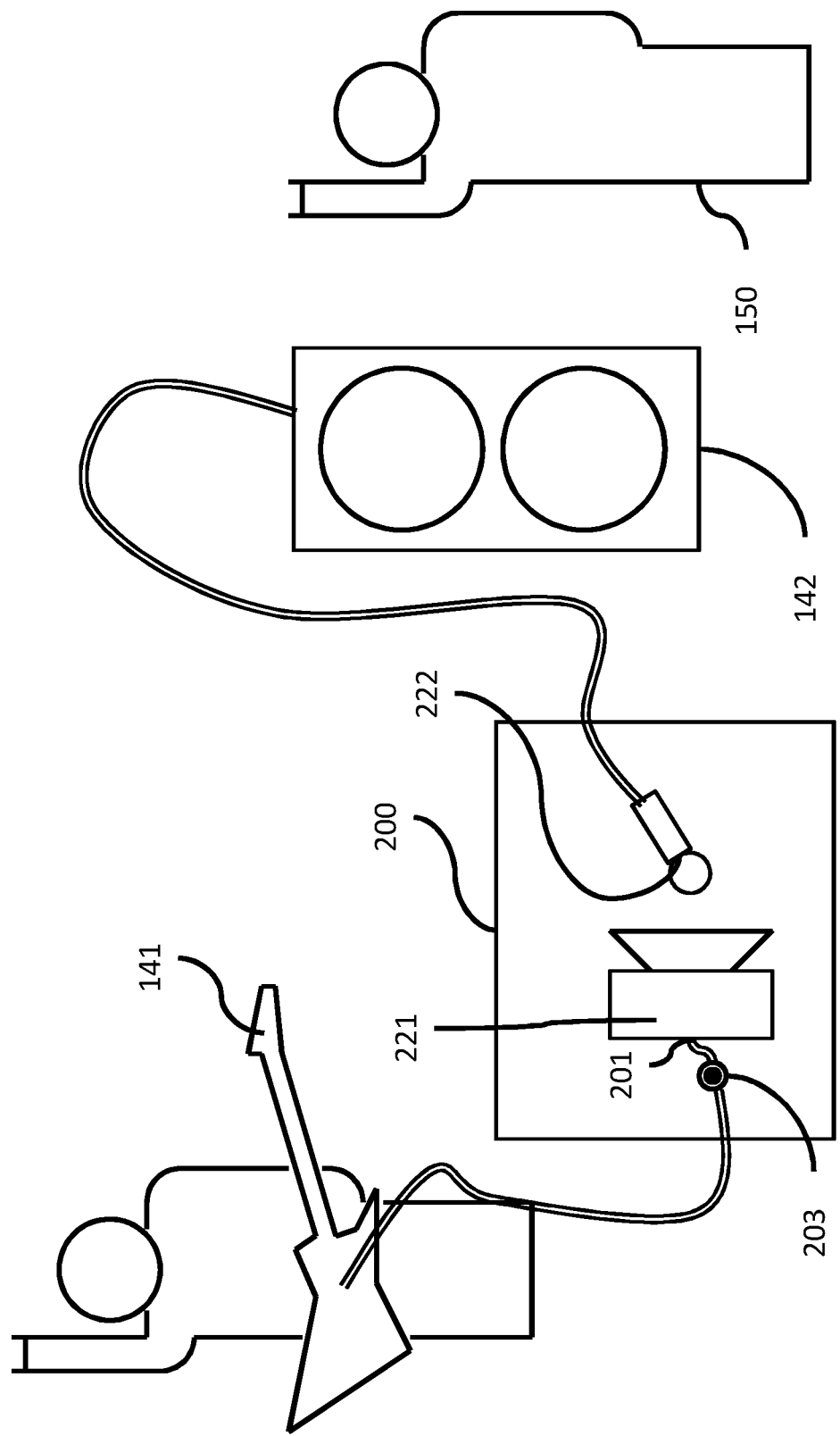

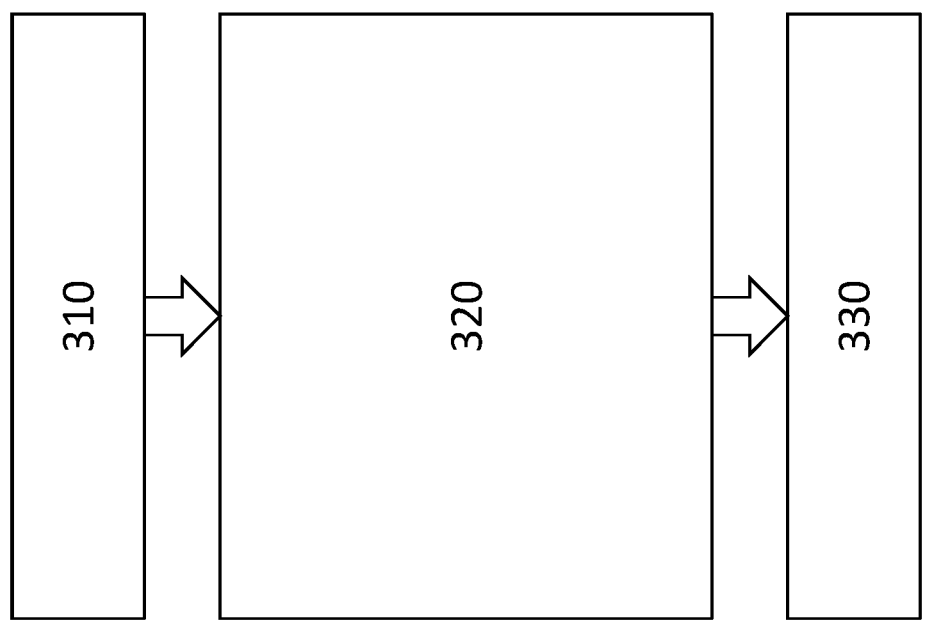

DIFFERENTIAL MODELING OF ANALOG EFFECTS DEVICES AND GUITAR AMPLIFIERS

CROSS-REFERENCE TO RELATED APPLICATIONS

The present application claims priority under 35 U.S.C. Section 119 from German Patent Application No. 10 2022 106 576.6, filed on 21 Mar. 2022, entitled "Differential modeling of analog effects devices and guitar amplifiers". See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a sound converter and a method for adapting a sound converter to a reference sound converter.

2. Description of Related Art Including Information Disclosed Under 37 CFR 1.97 and 37 CFR 1.98

The sound generation of a musical instrument is usually carried out in three steps. First, the musical instrument is excited, for example, by stroking a bow over the string of a violin, striking a hammer on a string of a piano, or blowing against a reed of a saxophone. In a second step, parts of the excited frequency spectrum are deliberately amplified or attenuated in one or more resonators. The resonator or resonators typically determine the basic frequency of the individual tones. The resonators can have constant or variable properties. Examples of resonators of the above-mentioned musical instruments are the strings of the violin, the effective length of which can be continuously varied by the violin player in terms of a resonator having variable properties; the strings of the piano, the length of which is typically invariable, so that they can be referred to as a resonator having constant properties; and the air column of the saxophone, the length of which can be changed by closing/opening valves of the saxophone arranged at predetermined intervals, so that a resonator having variable properties is also provided. In a third step, the vibration energy introduced into the instrument by means of the excitation, the frequency components of which have been deliberately amplified/attenuated in the resonator, are emitted to the surrounding air using an acoustic converter. The sound box of the violin, the sound board of the piano, or the bell of the saxophone acts as an acoustic converter.

The examples of acoustic converters described above regularly not only ensure transmission of the vibrations to the surrounding air, but also substantially influence the individual sound character of an instrument. Even untrained people can typically distinguish the sound of a violin from the sound of a viola, although the instruments differ essentially only in the size of the sound box. Therefore, the term sound converter can also be used.

In the case of an electrical musical instrument, for example an electric violin, an electric guitar or an electric bass, the chain of pickup, amplifier, and loudspeaker can be regarded as a sound converter.

This chain often comprises at least one adjustable analog circuit, with which the sound can be influenced. Examples of such an analog circuit are the gain controller of an analog guitar amplifier and/or the tone stack of an analog guitar amplifier and/or a distortion pedal. Sometimes the tone stack is also referred to as an equalizer. The analog circuit can also comprise topologies with multiple parallel signal paths. The gain controller is provided at the input of the analog guitar amplifier and is used by the user to set the level of the input signal of the analog guitar amplifier and thus in particular the degree of distortion of the analog guitar amplifier arranged downstream.

Musicians are increasingly using digital replicas of analog reference sound converters. An exemplary method for adapting a (digital) sound converter to a reference sound converter is described in DE 10 2019 005 855 B4.

The method known from DE 10 2019 005 855 B4 enables a user to automatically adapt a sound converter to a reference sound converter without requiring prior technical knowledge of the analog (partial) circuits of the reference sound converter.

Such an adaptation without detailed knowledge of the reference sound converter can also be referred to as gray box modeling and is also known in practice as "profiling" or "capturing".

Sound converters adapted by means of profiling are said to have a high sound authenticity, since they replicate the sound character of specific reference sound converters. In particular, with profiling it is implicitly taken into account that the components of reference sound converters are subject to variations in terms of their properties. As a result, two reference sound converters of the same type can have different sound properties.

Despite the achievable high sound authenticity, users regularly shy away from the effort associated with profiling for every possible setting of a reference sound converter with an adjustable analog circuit.

Proceeding from this, there is consequently a need for a practicable method for adapting a sound converter to a reference sound converter at a target setting of an analog circuit of a reference sound converter and for a corresponding sound converter.

BRIEF SUMMARY OF THE INVENTION

According to the invention, this need was met with the method according to the main claim and the sound converter according to the independent claim. Advantageous embodiments are specified in the dependent claims.

A method is proposed for adapting a sound converter to a reference sound converter at a target setting of an analog circuit of the reference sound converter, wherein the sound converter has a sound transfer function, wherein the analog circuit is digitally modeled by an analog function, wherein, at a default setting of the analog circuit, parameters of the sound transfer function of the sound converter are adapted to the reference sound converter, wherein an analog function inverse to the analog function with default analog parameters corresponding to the default setting and the analog function with target analog parameters corresponding to the target setting are applied before or after the sound transfer function.

Component variations causing a change in the behavior of the analog circuit depending on the setting of the analog circuit are of less significance than component variations changing the behavior of an analog circuit at a predefined setting compared to another analog circuit at the same predefined setting, so that lack of their consideration in digital modeling by the analog function with regard to the adaptation of the sound converter to the reference sound converter is negligible. In one embodiment of the method, the sound transfer function is a nonlinear sound transfer function.

In particular, the nonlinear sound transfer function may correspond to a frequency response resulting from the combination of a first frequency response of a first linear transfer function, a second frequency response of a second linear transfer function and a nontrivial nonlinearity connected between the first and second linear transfer function.

At the default setting of the analog circuit, the parameters of the transfer function of the sound converter can be adapted to the reference sound converter by means of a deterministic method.

It is also conceivable, at the default setting of the analog circuit, to adapt the parameters of the transfer function of the sound converter to the reference sound converter by means of machine learning.

Furthermore, a sound converter is proposed, wherein the sound converter has means for carrying out one of the above methods.

BRIEF DESCRIPTION OF THE SEVERAL VIEWS OF THE DRAWINGS

In the following, the invention will be explained in greater detail with reference to exemplary embodiments. In the schematic figures:

FIG. 2 shows a diagram of music playback with a reference sound converter;

FIG. 3 shows a flowchart for adapting the sound converter to the reference sound converter.

DETAILED DESCRIPTION OF THE INVENTION

Figure 1:
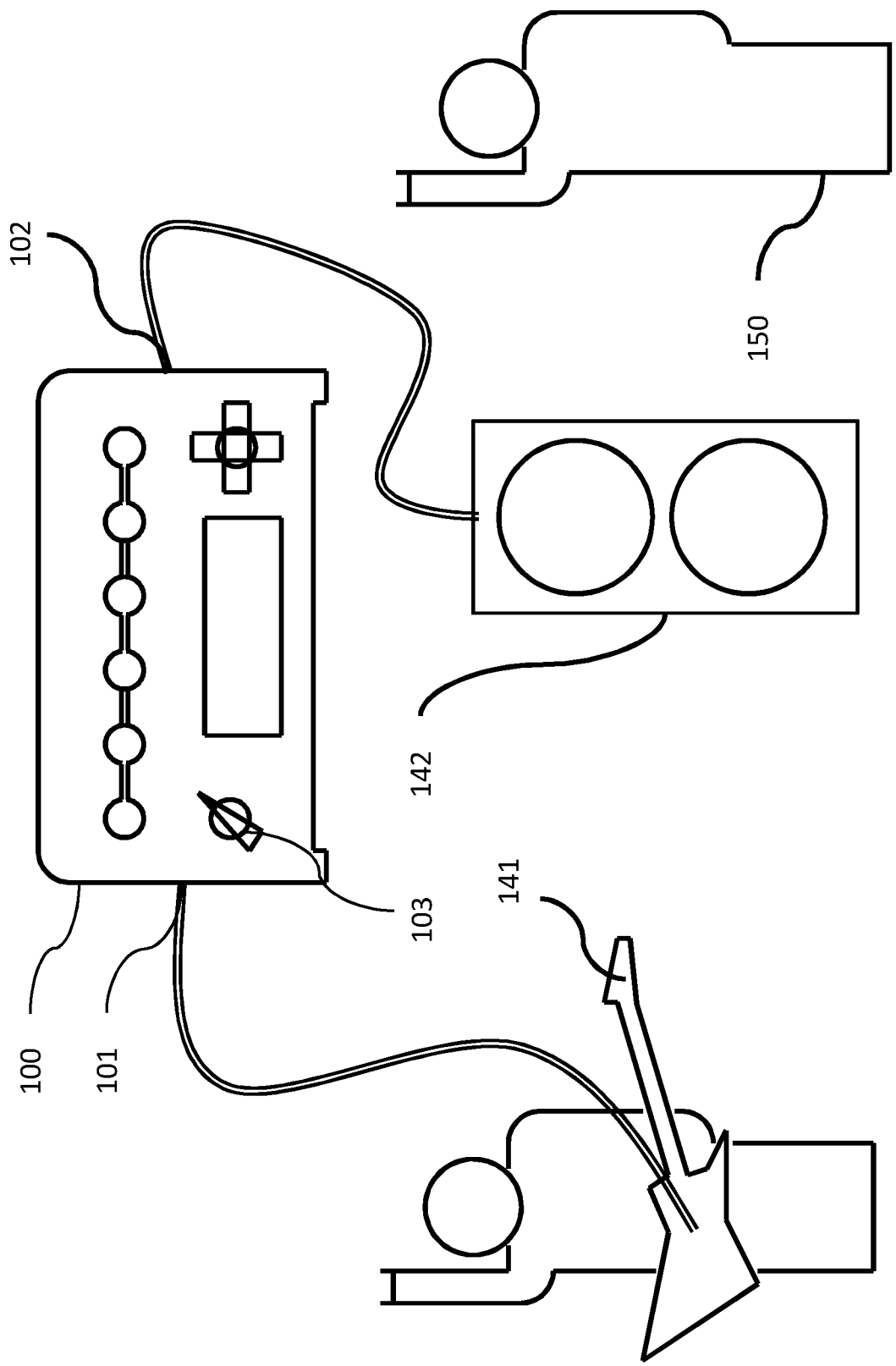
FIG. 1 shows a diagram of music playback with a sound converter.

The sound converter 100 shown in FIG. 1 has an input 101 for an input signal and an output 102 for an output signal. For example, the signal from a pickup of an electric guitar 141 can be used as the input signal of the sound converter 100. The output signal of the sound converter 100 can, optionally after further amplification, be output as an acoustic signal via a loudspeaker 142, so that the listeners 150 can perceive the guitar music. The sound played back via the loudspeaker 142 can consequently be influenced by means of the sound converter 100.

The sound converter 100 has a rotary knob 103 which can be used to specify a target setting corresponding to a target setting of an analog circuit of a reference sound converter.

FIG. 2 shows an example of a reference sound converter 200. The signal from a pickup of the electric guitar 141 is first pre-amplified by means of a gain controller 203 and then supplied to the input 201 of an analog guitar amplifier 221. This amplifies the signal, which is then output via a loudspeaker of the guitar amplifier 221, recorded again by a microphone 222 placed in front of the loudspeaker and subsequently played back via a loudspeaker 142, so that the listeners 150 can enjoy the music.

A gain controller 203 typically has a potentiometer, which is connected as a voltage divider, and often additionally a capacitor connecting the input of the potentiometer to the pickup or the output of the potentiometer.

The analog circuit in the form of the gain controller 203 is located at the input 201 of the analog guitar amplifier 221 and is used by the user to set the input level of the analog guitar amplifier 221 and consequently in particular the degree of distortion of the analog guitar amplifier. The distortion itself typically occurs in a further amplifier stage of the analog guitar amplifier 221.

The optionally existing additional capacitor, which is also called bright cap, can cause a short circuit of the potentiometer for high frequencies connected as a voltage divider. A change to the setting of the potentiometer consequently results in little change in the signal level for high frequencies. In contrast, a change to the setting of the potentiometer for low frequencies causes a much more significant change in the signal level. Consequently, the potentiometer of the gain controller 203 can be used to significantly change not only to the input level, but also to the frequency response of the input signal of the analog guitar amplifier 221.

The gain controller 203 influences the frequency response more typically at each setting. An exception is usually the maximum setting, at which the capacitor is short-circuited. However, there are also gain controllers that have a noticeable effect on the frequency response even when the gain controller is set to its maximum setting.

Other analog circuits of a reference sound converter, for example, the equalizer of an analog guitar amplifier, which is also called tone stack, typically influence the frequency response in every setting.

FIG. 3 shows an example of a flowchart to illustrate a method for adapting a sound converter to a reference sound converter at a target setting of an analog circuit of the reference sound converter, wherein the sound converter has a sound transfer function.

In exemplary embodiments, the analog circuit can correspond to the gain controller described above. In principle, the analog circuit can also comprise equalizers. The analog circuit is digitally modeled by an analog function (step 310).

For example, the analog circuit of a gain controller described above can be digitally modeled by an analog function. For example, the gain controller can be replicated by a digital level control and a single-pole shelving filter connected upstream or downstream. The parameters of the shelving filter can be derived from the position of the digital level control. Alternatively, it is conceivable to offset the digital level control with parameters of the shelving filter.

At a default setting of the analog circuit, parameters of the sound transfer function are adapted to the reference sound converter (step 320).

The adaptation of the sound transfer function to the reference sound converter at the default setting of the analog circuit can be done in different ways. It can be carried out both with deterministic methods and by means of machine learning. Deterministic methods for adapting a sound transfer function are known, for example, from DE 10 2019 005 855 B4 and U.S. Pat. No. 11,164,551 B2.

The sound transfer function can comprise complex networks of filters and nonlinearities connected in series or in parallel. The analog function can be positioned before or after the sound transfer function in the signal flow, but also parallel to the sound transfer function. It should be noted here that analog functions can be located anywhere in the network, i.e. including in parallel with parts of the sound transfer function, and including combined in series with other parts of the sound transfer function.

Typically, the default setting of the analog circuit is specified by a user. The choice of the default setting can be based on technical and/or artistic criteria. With many equalizer circuits, choosing the middle setting as the default setting can be advantageous. It can often be set very easily and precisely by the user. In the case of a gain controller, it can be advantageous to select the maximum setting as the default setting, since the properties of the reference sound converter can be determined particularly precisely in this way when adapting the sound transfer function.

It is conceivable to later determine the default setting of the analog circuit from the parameters of the adapted sound transfer function. As described above, the setting of a gain control usually affects not only the level of a reference sound converter, but also the frequency response. The default setting of the gain controller can consequently be determined via a suitable weighted level measurement of the frequency response, taking into account an analog function which digitally models the analog circuit.

Subsequently, an analog function inverse to the analog function with default analog parameters corresponding to the default setting and the analog function with target analog parameters corresponding to the target setting are applied before or after the sound transfer function (step 330).

Therefore, the highest possible sound neutrality can be achieved at the default setting. This can make it easier to replicate multiple analog circuits of a reference sound converter using multiple analog functions, with the sound neutrality essentially being retained with default analog parameters of the multiple analog functions. These analog functions can each be added individually or jointly to the sound transfer function at the default setting, in particular the profile of the sound transducer, or removed from it without the sound transfer information at the default setting having to be redetermined.

In the case of a gain controller, a digital level control, i.e. a digital model of the potentiometer, with target parameters corresponding to the (desired) target setting of the potentiometer of the gain controller can consequently be applied to the pick-up signal first.

A shelving filter with target parameters corresponding to the target setting of the potentiometer will be applied to the signal. In particular, the shelving filter can digitally model the frequency response influenced by the bright cap capacitor.

Furthermore, an inverse level control is applied to the signal. The parameters of the inverse level control correspond to the default setting with which the sound converter was adapted to the reference sound converter.

Finally, an inverse shelving filter with parameters corresponding to the default setting is applied to the signal.

The inverse analog function, which is formed by an inverse level control and an inverse shelving filter, can equalize the influence of the analog circuit on the sound transmission function at the default setting of the reference sound converter, while the analog function itself allows the user to set an effect corresponding to the analog circuit.

Preferably, the analog function and the inverse analog function are applied before the sound transfer function if the analog circuit is located at the input of the reference sound transducer, and after the sound transfer function if the analog circuit is located at the output of the reference sound transducer. In principle, the analog function is applied at the point where the analog circuit is located in the signal flow of the reference converter. This can, for example, also comprise a location parallel to the sound transfer function or parts of the sound transfer function.

The method proposed here makes it possible to replicate setting options such as those available with conventional reference sound converters, in particular analog guitar amplifiers, in particular the intensity of the distortion using a gain controller provided at the input of the analog guitar amplifier or general setting options for the frequency response, on the input side or output side, by a digital sound converter.

In contrast to classic modeling, which is limited to the digital replication of a generic analog circuit only, the method described not only makes it possible to take component variations into account, at least partially. In addition, the sound character of a downstream guitar loudspeaker, one or more microphones placed in front of it, and the surrounding room can be captured.

In particular, the placement and mix of microphones can have a major influence on the sound transfer function and be an expression of artistic creativity. This aspect can make the sound transfer function an artistically valuable asset.

With the method described here, it is typically not necessary to know the exact type of reference sound converter (e.g. the analog guitar amplifier or a reference effects device). In particular, virtually all guitar amplifiers and many distortion pedals can be reduced to a simple basic structure comprising two linear transfer functions (filters) with a nontrivial nonlinearity in between.

In the known method, it is conceivable to adapt the parameters of the sound transfer function of the sound converter to the reference sound converter at a default setting of its analog circuit, before digitally modeling the analog circuit by an analog function. The latter can be done at a later point in time, in which case access to the reference sound converter is no longer required.

In particular, it may be possible to later optimize the sound of the digitally modeled analog function.

The digitally modeled analog function can also be referred to as a differential model. The differential model only has to replicate those parts of the analog circuit that can be changed by the user, for example, via switches and potentiometers. Those circuit parts which remain constant in terms of their properties are usually in the majority and can already be taken into account when adapting the sound transfer function to the reference sound converter at the default setting of the analog circuit. This can significantly reduce the development effort for differential modeling.

The differential model can be divided into several parts, each of which only replicate individual aspects of the analog circuit.

The differential model is preferably selected such that it is as sound-neutral as possible, in particular absolutely sound-neutral, if the user-configurable setting options of the model are set identically to the default settings (or default values) of the reference sound converter.

We claim:

1. A method for adapting a sound converter with which a target setting can be specified which corresponds to a target setting of an analog circuit of a reference sound converter,
   wherein the sound converter has a sound transfer function,
   wherein the analog circuit is digitally modeled by an analog function,
   adapting, at a default setting of the analog circuit, parameters of the sound transfer function of the sound converter to the reference sound converter, and
   applying an analog function inverse to the analog function with default analog parameters corresponding to the default setting and the analog function with target analog parameters corresponding to the target setting before or after the sound transfer function.

2. The method for adapting the sound converter according to claim 1, wherein the sound transfer function is a nonlinear sound transfer function.

3. The method for adapting the sound converter according to claim 2, wherein the nonlinear sound transfer function corresponds to a frequency response resulting from the combination of a first frequency response of a first linear transfer function, a second frequency response of a second linear transfer function and a nontrivial nonlinearity connected between the first and second linear transfer function.

4. The method for adapting the sound converter according to any one of claims 1 to 3, wherein, at the default setting of the analog circuit, the parameters of the transfer function of the sound converter are adapted to the reference sound converter by means of a deterministic method.

5. The method for adapting the sound converter according to any one of claims 1 to 3, wherein, at the default setting of the analog circuit, the parameters of the transfer function of the sound converter are adapted to the reference sound converter by means of machine learning.

6. A sound converter configured to specify a target setting which corresponds to a target setting of an analog circuit of a reference sound converter,
   wherein the sound converter has a sound transfer function comprising an analog function,
   wherein, with default analog parameters corresponding to a default setting of an analog circuit of a reference sound converter,
   the sound converter is adapted to the reference sound converter, and
   wherein, in case of a change to parameters of the analog function, the sound transfer function changes such as occurs in case of a corresponding change to a setting of the analog circuit of the reference sound converter.

7. The sound converter, in particular the sound converter according to claim 6, wherein the sound converter has means for carrying out a method according to any one of claims 1 to 5.

* * * * *